March 4, 1941.  L. BUDNICK  2,233,731
OUTLET BOX
Filed Feb. 7, 1938
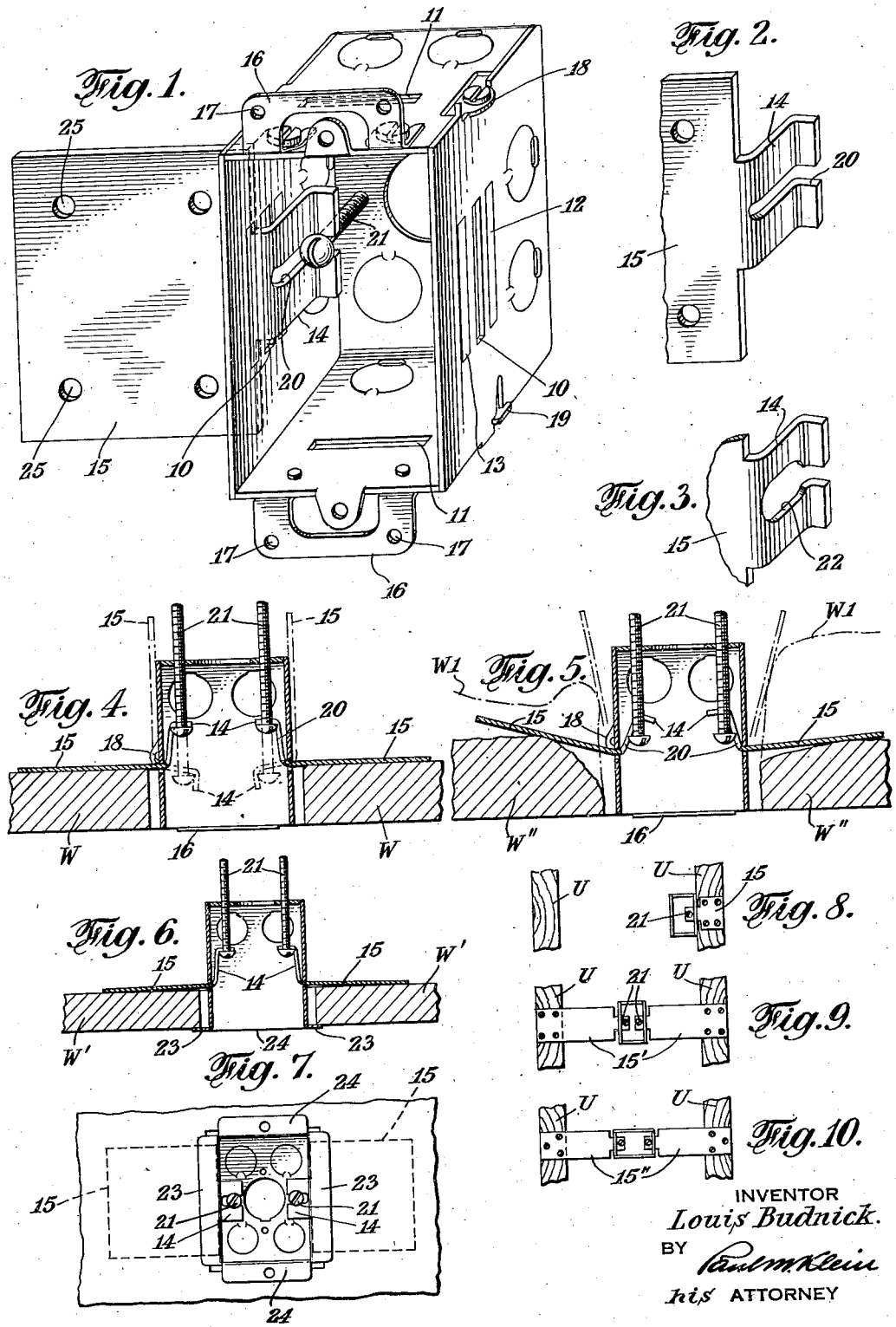
INVENTOR
Louis Budnick.
BY
*Paul M. Klein*
his ATTORNEY Patented Mar. 4, 1941

2,233,731

UNITED STATES PATENT OFFICE 2,233,731

OUTLET BOX

Louis Budnick, New York, N. Y., assignor to Sadye Budnick, New York, N. Y.

Application February 7, 1938, Serial No. 189,155

5 Claims. (Cl. 220—3.6)

This invention relates broadly to electric appliances, and especially to electric outlet boxes and means for their attachment, to and their connection with existing finished or unfinished wall structures.

The employment of so-called outlet boxes for housing switches, plug receptacles, electric lighting fixtures or similar electric appliances are well known. Their shapes, sizes, depths and arrangements differ in accordance with the purpose for which they are especially designed. The difficulties encountered by the electrician in neatly, quickly and securely attaching them either to new or old wall structures, is well recognized in the trade.

It is the prime object of my invention to minimize the above stated difficulties and to enable the electrician to not only quickly, but neatly and securely place an outlet box of any shape or size, and for any purpose, either within an existing ceiling or an existing wall, or to attach it conveniently and inexpensively to a newly erected structure wherein the finish of the wall, that is the plastering, is to follow the work of the electrician.

Another object of my invention is to so construct my outlet box attaching means that an existing wall or ceiling structure will not be injured or weakened by the attachment of an outlet box.

Still more specific objects of my invention and its further advantages will become more fully apparent from the ensuing description, in connection with the accompanying drawing.

It is to be understood that the drawing is intended for explanatory purposes only, and shall not limit my invention in any sense to the few structures illustrated, nor to the shape of outlet boxes shown.

Referring now to the drawing,

Fig. 1 is a perspective view of a conventional rectangular outlet box, provided at one side with my box attaching means in the form of a plate.

Fig. 2 is a perspective view of a portion of the plate in one of its embodiments.

Fig. 3 illustrates a plate extension in another embodiment.

Fig. 4 is a cross-sectional view through an outlet box provided with my box attaching means in a wall engaging position, wherein the inner surface of the wall is fairly smooth and parallel to the outer surface of the wall.

Fig. 5 illustrates a similar cross-sectional view through an outlet box, as shown in Fig. 4, and wherein the inner surface of the wall is uneven.

Fig. 6 illustrates a cross-sectional view through a modified form of my outlet box attached to the wall, wherein the wall is somewhat thinner than the wall shown in Fig. 4.

Fig. 7 is a front elevation of an attached outlet box as shown in Fig. 6.

Fig. 8 illustrates an outlet box provided with my attaching means secured to a single upright of a wall structure, before the wall plaster or wall finish is applied.

Fig. 9 illustrates a modified form of my plates extending from an outlet box, and which plates are secured to two adjacent uprights of a newly erected, unfinished wall structure.

Fig. 10 illustrates a modified form of my attaching plates, similar to those shown in Fig. 9, wherein, however, the plates extend from the narrow walls of the box.

The outlet box illustrated in Fig. 1 is a typical example of a common rectangular outlet box used by electricians.

In producing my box, I provide in either two opposite walls of the box, or in all four walls thereof, elongated slots, such as indicated at 10 and 11, which are substantially parallel with the outer edges of the box. I may provide, for practical purposes to be explained later, additional knock-out slots 12 and 13, either in both side walls, or in both end walls, or in all of the walls of the box. Slots 10, 11, 12 and 13 are intended to accommodate specially designed, fork-like extensions 14 of wall engaging plates 15.

From Fig. 1 it is evident that I intend to provide one attaching plate, such as plate 15, with each box wall, and that the widths of the plate of each wall approximates that of the wall with which the plate is associated.

Outlet boxes known in the market today are usually provided with a pair of instrumentalities, such as indicated at 16, for engaging the outer surface of the wall to which an outlet box is to be attached.

These instrumentalities preferably constitute removably mounted brackets, provided with apertures 17, into which are usually placed screws for holding the box against disengagement from an existing wall.

In order to thus attach the box to the wall, the electrician is required to carefully cut a hole in the wall, which must be neither too small nor too large, but accurate sufficiently for snugly receiving the box body.

If, however, the hole should by accident become longer, or crumbles at its short edges, the attachment of the box by screws, intended to be driven into the wall edges through apertures 17 of brackets 16, becomes either very difficult or impossible, unless the excess opening is replastered. This consumes a considerable amount of time and generally is unsatisfactory.

The hole cut in the wall for receiving an outlet box has to be of a sufficient width to accommodate side lugs 18 and 19, by means of which the side walls of the box are held in place. (See Fig. 1.) Plates 15, with their substantially fork-like extension 14, are pivotally mounted in the box wall slots and are so constructed that when the box is to be inserted into the hole provided in the wall, these plates are moved to a position at which they are flatly adjacent to the walls of the box, as clearly indicated in broken lines in Fig. 4. It is to be noted that plates 15 must not project in their "inserting" position beyond side lugs 18 and 19 of the box.

Fork-like extensions 14 are provided with slots 20 which are engaged by screws 21, the latter extending from threaded apertures made in the bottom of the outlet box.

I prefer to provide slots 20 so that they extend throughout the entire length of extensions 14. However, the shape of slot 20 may be altered, as indicated at 22 in Fig. 3, when a quick disengagement of plates 15 from screws 21 and from the box slots is desired, and where no angular adjustment of the plates is required. This is especially desirable for attaching outlet boxes to new constructions, such as indicated in Figs. 8, 9 and 10, or where the thickness of the wall structure, to which the box is to be attached, is known, and when the plates are intended to assume a position similar to that indicated in Fig. 4. For placing boxes in finished walls, I prefer to retain uniformly sized slots 20, such as shown in Fig. 2.

In Figs. 1, 4 and 5, I have illustrated outlet boxes wherein the usual wall attaching brackets 16 are employed. In Figs. 6 and 7, I have shown a box wherein the outer wall edges are bent over to form permanent flanges 23 and 24, and to serve for engaging simultaneously the outer surface of all four edges of the hole, cut into the wall, for the reception of outlet boxes. However, the construction of plates 15 and their operation, induced by screws 21 against extensions 14 of the plates, remains the same.

By comparing Fig. 4 and Fig. 6 with one another, it will be clearly evident that while in Fig. 4 plates 15 fully engage, with practically their entire faces, the inner surface of wall W, in Fig. 6, plates 15 are slanting downwards since wall W' is somewhat thinner. The major area of engagement between wall W' and the plates, however, is far remote from the edges of the hole, thus precluding any possibility of cracking or breaking-out of the wall, especially at or near the edges of the hole, thereby preventing an undesirable enlargement of the hole beyond a size for snugly accommodating and securely holding the outlet box in the wall.

In Fig. 5 I have illustrated an outlet box attached to a wall structure W" in which the inner surface of the wall is uneven. In this case, plates 15 assume a more acute angular position in respect to the side walls of the box when the plates are tightened down by means of screws 21.

It will also be observed that in this figure the end lips of extensions 14 are not engaged by the heads of screws 21, as is the case in Figs. 4 and 6, but that the screw heads bear against slots 20 of extensions 14 near the pivotal point of the plates.

Although the inner face of the wall structure W", indicated in full lines in Fig. 5, are shown to be relatively slightly uneven, it is quite obvious that the unevenness or thickness of the wall may exceed the full-line illustration in this figure; and in the event the thickness of the wall is greater, such as indicated in broken lines at W1, the plates will assume a very acute angular position in respect to the box walls and will form, together with the box body, a veritable wedge which will forcibly bear against the sides of the hole made into the wall. Even at such an acute engagement of the plates with the wall structure, plates 15 will nevertheless securely hold the outlet box in its intended position within the wall.

In constructing plates 15, it will be readily seen that they are made of a one piece, and that extensions 14 form an integral part of the plate. The construction of extensions 14 are of sufficient strength to assure their positive engagement by screws 21, and a positive retention of plates 15 in any position to which they are forced by the adjustment of screws 21.

The plates are intended to be pivotally lodged in their respective slots provided in the box sides. It will be often found that the thickness of a plaster wall structure, or for that matter of other types of structures into which an outlet box is to be fitted, will greatly vary. Although the plates may swing in their slots from their "inserting" position (flat against the sides of the box, and with their outer ends adjacent to the bottom of the box, as seen in broken lines in Fig. 4), to any position within an angle of about 110 degrees, I prefer for best results to place the plates at right angles to the box sides, or as flatly against the inner face of the wall structure as is possible.

When the thickness of the wall into which an outlet box is to be placed is so great, that the plates would have to assume an acutely angular attaching position, while in engagement with the slots nearest to the outer edge of the box, I prefer to change their location by knocking out the next or the third slots and moving the pivotal points of the plates towards the bottom of the box. For this reason I provide a suitable number of plate receiving knock-out slots, as illustrated in Fig. 1.

*Operation*

The attachment of outlet boxes to existing finished wall structures is not only extremely simple, but expeditious and highly efficient as well. As usual, a hole is cut into the wall structure sufficiently large to receive the box. Screws 21 are loosened so that the plates, that is a single plate at each side of the box, may be swung into a position flatly adjacent to their respective box sides. The thickness of the plates being less than outward dimensions of lugs 18 and 19, the plates will easily slide in their "inserting" position into the wall hole together with the box. The box is forced in until brackets 16 (Fig. 1), or flanges 23 and 24 (Figs. 6 and 7) bear against the outer surface of the wall structure. Now screws 21 are tightened until extensions 14 bring the plates into as full a contact as possible with the inner surface of the wall structure. Thus the work is quickly and dependably finished.

In all Figures, 1 to 7, inclusive, I have dealt with the attachment of outlet boxes to existing finished wall structures. In Figs. 8, 9 and 10, however, I show typical examples of attaching an outlet box to unfinished wall structures, such as uprights indicated at U in these figures.

In Fig. 8 a construction similar to that shown in Fig. 1 is illustrated, wherein a single plate 15 is employed and is secured by means of screws, passing, through apertures 25 provided in the plate, into upright U. Since screw 21 is tightened down against the lip of plate extension 14, and the side wall of the box bears against the side face of upright U, the box is fastened in a secure position.

Another modified form of attachment is illustrated in Figs. 9 and 10. In Fig. 9 relatively long plates 15' are employed, their ends being also provided with suitable wood-screw receiving apertures, such as apertures 25 in Fig. 1. When adjusting screws 21 are tightened down, the plates will evenly extend sidewise from the box and thus facilitate their secure attachment by means of wood-screws to two adjacent uprights.

The same construction is shown in Fig. 10 with the exception that plates 15" extend sidewise from the shorter end walls of the box. From Figs. 9 and 10, it will be clearly seen that the width of the plates correspond to, or substantially equals the width of the box walls from which the plates project.

In the foregoing description and in the drawing, I have dealt with so-called "square" outlet boxes which are actually oblong. It is, however, obvious that attaching plates, of the type shown and described, may be provided with any other shape or type of outlet boxes used in the electric trade, provided that they have either detachable or fixed instrumentalities at their outer edges, such as shown in Figs. 1 and 6, at 16, or 23 and 24, respectively, for engaging the outer face of a wall structure, that is to say when the outlet boxes are to be applied to existing finished wall structures. I have also described typical types of plates for engaging the inner face of a wall structure, or serving for attachment of boxes to unfinished wall structures, such as indicated at Figs. 8 to 10, inclusive.

It is quite evident, however, that the shape of the plates may be altered, or that their construction may be lightened by suitable cut-outs (not shown), or that they may be otherwise changed to advantage, as long as the plates will permit their simultaneous insertion, together with the box, into a hole cut into existing finished wall structures in the manner indicated in Fig. 4, and will serve for the broad purposes indicated, that is for engaging the inner face of the wall structure with practically the entire flat faces of the plates, thereby assuring the distribution of attaching pressure over a wide area, and thus preventing any possibility of breaking out the edges of, and enlarging the hole made into the wall for the reception of the outlet box.

While all other features of my invention are specifically described in the foregoing, it is quite obvious that changes and improvements may be incorporated, and I therefore reserve for myself the right to make such changes and improvements as may be found advisable or practical for the manufacture of my article and its application in practice, all within the broad scope of my invention as defined in the annexed claims:

I claim:

1. In an outlet box having means for engaging the outer surface of a wall structure, the box walls being provided with slots substantially parallel with the outer edges of the box, a plate, the width of which approximates the length of the box wall, pivotally lodged in one of the slots and being so constructed and arranged as to be capable of swinging from its one position, adjacent to the box wall, to an extreme other position, substantially perpendicular to the box wall, that is to say, away from the bottom of the box, the plate having a materially reduced fork-like extension projecting into the box interior, a screw mounted in the bottom of the box and engaging with its head said fork-like extension, said screw, when tightened, causing the movement of the plate against the inner surface of such wall structure.

2. The combination with an outlet box, of a relatively broad single plate pivotally mounted in, and exteriorly to one of its walls, a reduced bifurcated plate extension projecting into the box interior, and means operatively secured in the box bottom and engaging the bifurcation of said extension for actuating said plate.

3. The combination with an outlet box, of a plate pivotally lodged at, and extending exteriorly to the wall of the box and corresponding in width substantially to the length of said box wall, a fork-like formation constituting an integral, reduced extension of the plate and projecting downwardly into the box interior, a screw extending from the box bottom and engaging the bifurcated end of said extension for operating the plate, said plate and its extension being so constructed and arranged that when the extension is forced down by the screw to its lowermost position within the box, said plate will be rigidly held against movement relative to the box, substantially at right angles to the box wall.

4. An outlet box provided at its open end with external rigid resistance means, a hole in the box removed a substantial distance from the open edge of the box, a swinging element extending through said hole, its outer end being swingable towards the box bottom and flat against the side, means within the box engageable with the inner end of the element to draw the element back and to hold it.

5. An outlet box provided at its open end with external rigid resistance means, a hole in the box removed a substantial distance from the open edge of the box, a swinging element extending through said hole, its outer end being swingable towards the box bottom and flat against the side, means within the box engageable with the inner end of the element to move the element back and to hold it.

LOUIS BUDNICK.